United States Patent [19]

Muller

[11] Patent Number: 4,745,346

[45] Date of Patent: May 17, 1988

[54] ELECTRONIC POSTAGE METER PRINT WHEEL SETTING OPTIMIZATION SYSTEM

[75] Inventor: Arno Muller, Westport, Conn.

[73] Assignee: Pitney Bowes Inc., Stamford, Conn.

[21] Appl. No.: 27,144

[22] Filed: Mar. 16, 1987

Related U.S. Application Data

[63] Continuation of Ser. No. 657,707, Oct. 4, 1984, abandoned.

[51] Int. Cl.$^{4}$ .................... G05B 13/00

[52] U.S. Cl. .................... 318/685; 318/685

[58] Field of Search .................... 318/561, 685, 696, 577; 364/474, 464, 478, 148

[56] References Cited

U.S. PATENT DOCUMENTS

| | | | |
|---|---|---|---|
| 3,555,252 | 1/1971 | Garden | 318/561 X |
| 3,813,592 | 5/1974 | Ryberg | 318/685 X |
| 3,890,492 | 6/1975 | Manduley | 235/151.33 |
| 3,938,095 | 2/1976 | Check | 340/172.5 |
| 3,950,685 | 4/1976 | Krame | 318/561 |
| 3,978,457 | 8/1976 | Check | 340/172.5 |
| 4,007,361 | 2/1977 | Martin | 318/561 |
| 4,016,467 | 4/1977 | Hallenbeck | 318/604 |
| 4,025,837 | 5/1977 | Meier | 318/561 |
| 4,250,544 | 2/1981 | Alley | 318/138 |
| 4,258,622 | 3/1981 | Estrabaud | 318/685 X |
| 4,268,783 | 5/1981 | Murray | 318/561 X |
| 4,280,180 | 7/1981 | Ekert | 364/464 |
| 4,287,825 | 9/1981 | Eckert | 101/91 |
| 4,291,620 | 9/1981 | Yamasaki | 101/99 |
| 4,301,507 | 11/1981 | Soderberg | 364/464 |
| 4,325,440 | 4/1982 | Crowley | 177/25 |
| 4,340,848 | 7/1982 | Hanagata | 318/561 |
| 4,490,665 | 12/1984 | Meyer | 318/696 |
| 4,517,503 | 5/1985 | Lin et al. | 318/561 |
| 4,558,265 | 12/1985 | Hayashida et al. | 318/561 |

*Primary Examiner*—William M. Shoop, Jr.
*Assistant Examiner*—Patrick C. Keane
*Attorney, Agent, or Firm*—Charles G. Parks, Jr.; David E. Pitchenik; Melvin J. Scolnick

[57] ABSTRACT

A postage meter system of the type having postage value input selection means, a postage printing means with a settable printing element and a drive means coupled to said postage printing means for setting the postage printing element including a print element setting system. The element setting system employs the drive means such that the drive means is operable to drive said printing element at different operating speeds to set said postage printing element to a selected postage value. The print element setting system further includes a position detecting means and a control means. The position detecting means detects the actual position setting of the printing element. The control means is coupled to the input selection means and the drive means for controllably causing the drive means to change the position of the postage printing element from an initial position to a selected position corresponding to a prescribed position by the input selection means at a given setting speed and incrementally increasing the setting speed for each successive position change of the postage printing element up to a maximum setting speed. The control means is further coupled to the position detection means for comparing the actual position of the postage printing element to the selected position by the input selection means such that should the selected position and the detection position of said postage printing elements not correspond the control means shall position correct the postage printing element to the selected position and decrement the setting speed, setting the maximum setting thereto.

9 Claims, 4 Drawing Sheets

ELECTRONIC POSTAGE METER PRINT WHEEL SETTING OPTIMIZATION SYSTEM

This application is a continuation, of application Ser. No. 657,707, filed 10/4/84 now abandoned.

FIELD OF THE INVENTION

The present invention relates to electronic postage meter value selection setting systems, and more particularly, a system for optimizing the setting speed of the postage printing value selection mechanism.

BACKGROUND OF THE INVENTION

Postage meters are mass produced devices for imprinting a defined unit value for governmental or private carrier delivery of parcels and envelopes. The term "postage meter" also includes other like devices which provide unit value printing such as tax stamp meters. Postage meters include internal accounting devices which account for postage value representation which is stored within the meter and is printed by the meter. The postage printed by the meter is adjustable or settable through a value selection system to any value, within a range of values, selected by the postage meter user. The accounting for postage printed by the meter is stored only within the meter. As a result, postage meters must possess an extremely high reliability to avoid the loss of user or governmental funds stored within the meter.

Postage meters are often used in systems wherein the mail piece which is to receive a postage stamp impression, is transported to the postage meter for imprinting. Systems of this type have been proposed which are coupled to scales to weigh the mail piece to determine the appropriate postage. The scale mechanism in such systems may be connected to the postage meter to cause the postage meter value selection mechanism to operate to set the postage meter print elements to the appropriate postage for the weight of the mail piece weighed and to be transported to the postage meter.

It has been recognized that electronic postage meters are particularly suited for systems applications, such as the system described above. This is, in part, because electronic postage meters are adapted to be electronically interfaced with scale mechanisms so that the value selection mechanism of the postage meter can be controlled by a signal generated by the weighing device and coupled to an input port of the electronic postage meter.

Examples of electronic postage meters are disclosed in U.S. Pat. No. 3,938,095 for COMPUTER RESPONSIVE POSTAGE METER; U.S. Pat. No. 3,978,457 for MICROCOMPUTERIZED ELECTRONIC POSTAGE METER SYSTEM; and, in U.S. Pat. No. 4,301,507 for ELECTRONIC POSTAGE METER HAVING PLURAL COMPUTING SYSTEMS. In postage meters of the type disclosed in the noted U.S. patents, the accounting mechanism and the value selection mechanism are electronically controlled. The memory function in the electronic accounting circuits have replaced the function served in mechanical postage meters by mechanical accounting registers. The motor or solenoid operated, electronically controlled, setting mechanism have replaced the function served in mechanical postage meters by levers and thumbwheels. Both the accounting circuits and value selection system in such postage meters may be operated under microcomputer control.

The value selection system must operate accurately in adjusting the postage meter printing mechanism to an appropriate selected postage value to be imprinted. An error in the value selection mechanism could result in a loss of funds to either the user or government. Additionally, such an error could result in a mail piece being imprinted with a deficiency in the postage stamp value such that the governmental or private carrier will refuse or delay delivery of the parcels and envelopes, and/or, require additional postage to be paid over the amount printed on the mail piece, by either the sender or recipient.

In systems applications, it is desireable to increase the number of mail pieces which are imprinted with a postage stamp within a given unit of time without sacrificing the accuracy and reliability of the meter including the meter setting mechanism. By increasing the throughput, the productivity of the postage meter system is enhanced, diminishing the unit handling cost to the postage meter user of each mail piece. Nevertheless, because postage meters print unit value and are accounted for by no other mechanism than the postage meter accounting registers, the value set in the print mechanism must accurately reflect the value intended.

In recognition of the criticality of the postage value selection function, postage value selection confirmation systems have been incorporated in the electronic postage meter systems disclosed in U.S. Pat. No. 3,938,095 and U.S. Pat. No. 3,978,457.

SUMMARY OF THE INVENTION

The present invention optimizes the speed of the value selection mechanism in a postage meter. It is also believed that the system of the present invention will allow the specification for meter operating mechanism components which are less rigorous, thereby resulting in reduced cost, for mass produced postage meters. This is because of the self adjusting feature of the setting mechanism when setting errors are detected. Thus, for a mass produced postage meter, significant savings may result by allowing the purchase of less expensive components.

It has been discovered that the value selection mechanism speed in a postage meter can be maximized by controlling the postage meter such that each time the postage meter is energized, the meter setting mechanism is controlled to increase the setting speed for each new setting until an error is detected. At this point, the postage meter setting mechanism controller readjusts the setting speed to a lower speed where an error is not encountered. The operation of the postage setting mechanism then is operated for the duration of the meter use at the highest possible setting speed where no error is encountered.

It has been discovered that the speed with which postage value is set in a postage meter will become more and more important as the throughput of mail handling systems is increased. In systems where the postage to be printed on a mail piece is automatically determined, for example, by weighing on an electronic scale or by computation knowing the contents of the mail piece, and communicated electronically to a postage meter, the postage setting time may require the whole system to slow down or stop until the meter is ready to imprint the postage value on the mail piece. This is particularly important in mixed weight mail mailing systems applications where the meter print elements are frequently changed for imprinting the proper postage value on each mail piece passing through the system. It is therefore desireable to increase the setting speed to avoid such delays.

In a postage meter system embodying the present invention postage printing means are provided with settable postage printing elements. Drive means are coupled to the postage printing means for setting the postage printing means settable postage printing elements. The drive means are operable to drive the postage printing means settable postage printing elements at different operating speeds to set the postage printing elements to selected postage value to be printed. Control means are coupled to the drive means for controlling the drive means to set the postage means settable postage printing elements to the selected postage value and for controlling the speed of operation with which the drive means drives the postage printing means settable postage printing elements to the selected postage value to be printed. Error detecting means are coupled between postage value selection input means and the postage printing mechanism and are further coupled to the control means, for detecting errors between the selected postage value entered into the postage value selection input means and the actual setting of the postage printing means settable postage printing element setting and providing error information to the control means. The control means are operable in response to print element setting error information to control the speed with which the drive means operates to drive the postage printing means settable postage printing elements to a selected postage value.

The present invention further embodies the method of increasing the setting speed of the value selection mechanism of a postage printing device, detecting whether the setting at each speed results in a proper setting of the print elements of the postage printing device to the value intended and reducing the setting speed of the value selection mechanism of the postage printing device when predetermined setting error information is detected.

BRIEF DESCRIPTION OF THE DRAWINGS

A complete understanding of the present invention may be obtained from the following description of the preferred embodiment thereof, when taken in conjunction with the accompanying drawings, wherein like reference numerals designate similar elements in the various figures, and in which.

DESCRIPTION OF THE PREFERRED EMBODIMENT

Figure 1:
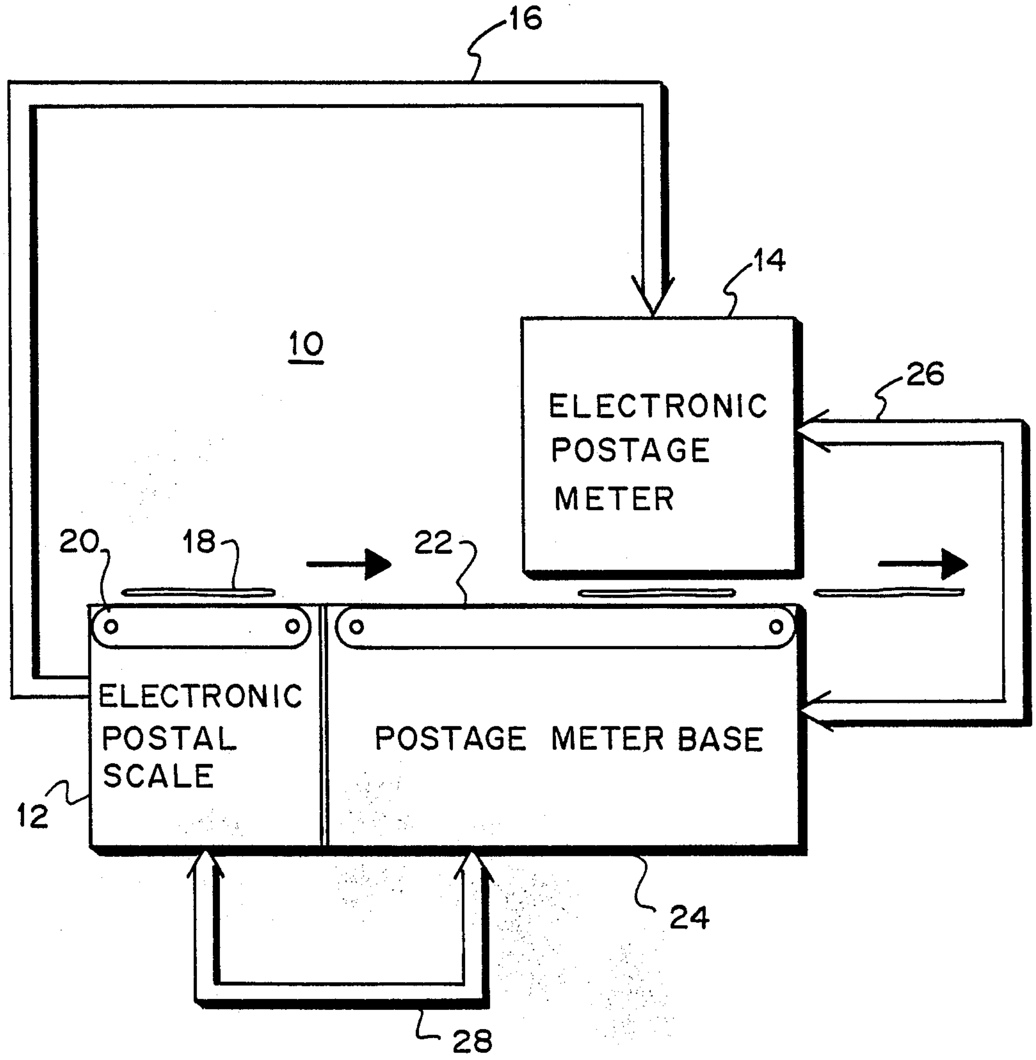
FIG. 1 is a block diagram of a postage meter system adapted to embody the present invention.

Reference is now made to FIG. 1. A postage meter system 10 includes an electronic postal scale 12 and an electronic postage meter 14. A communications bus 16 is connected between the electronic postal scale 12 and the electronic postage meter 14 for conveying information regarding the postage value required for a mail piece, such as mail piece 18 weighed by the scale in anticipation of having a postage stamp printed thereon by electronic postage meter 14.

The mail piece may be transported by a series of drive belts 20 and 22 to position the mail piece with respect to the electronic meter so that a postage value can be printed. The drive belt 22 may be part of a postage meter base 24 which is adapted to operate in conjunction with the electronic postage meter 14 such as by providing mechanical drive energy to drive the postage printing mechanism. A data bus 26 is provided between the electronic postage meter 14 and the postage meter base 24 for conveying status information regarding the operation of the electronic postage meter and the operation of the postage meter base 24. This information may be used to control the speed of the transport 20 and 22 to control the speed at which the mail pieces are transported from the postal scale 12 to the electronic postage meter 14. In this regard, a further data bus 28 may be provided for communicating information between the electronic postal scale 12 and the postage meter base 24. Additionally, if desired, the data bus 16 may be a bi-directional data bus, such as the data busses 26 ahd 28.

The electronic postage meter shown in FIG. 1 may be similar to the electronic postage meter shown in the aforementioned U.S. Pat. No. 4,301,507 for ELECTRONIC POSTAGE METER HAVING A PLURAL COMPUTING SYSTEMS, and the printing mechanism may be similar to the postage printing system disclosed in U.S. Pat. No. 4,287,825 for PRINTING CONTROL SYSTEMS a system for weighing a mail piece while in motion is disclosed in U.S. Pat. No. 3,890,492 for POSTAGE VALUE DETERMINING CONTROL CIRCUIT and also in U.S. Pat. No. 4,325,440 for METHOD AND SYSTEM FOR COMPUTING SPECIAL FEES IN PARCEL METERING SYSTEM.

It should be recognized with FIG. 1 that the information communicated by the electronic postal scale 12 to the electronic postage meter 14 over bus 16 is utilized to adjust the print wheels of the postage printing mechanism to the proper value. The length of time to properly position the print wheels for any given setting speed for the setting mechanism relates to the distance to be traversed by the printing elements. For example, the length of time to rotate a printing wheel from a one to a nine (when rotating in the direction from one to nine) will be greater than the time necessary to rotate the printing wheel from one to five. It should be also recognized that the number and amount of rotations can vary greatly depending on the nature of the mail pieces which are presented to the postage meter system 10 to be imprinted with postage. Thus, for mixed mail of extremely light and extremely heavy mail pieces, the postage meter print wheels may be continuously adjusted between various values. This adjustment of the print wheels from one value to another value can be the limiting factor for the postage meter system 10.

Figure 2:
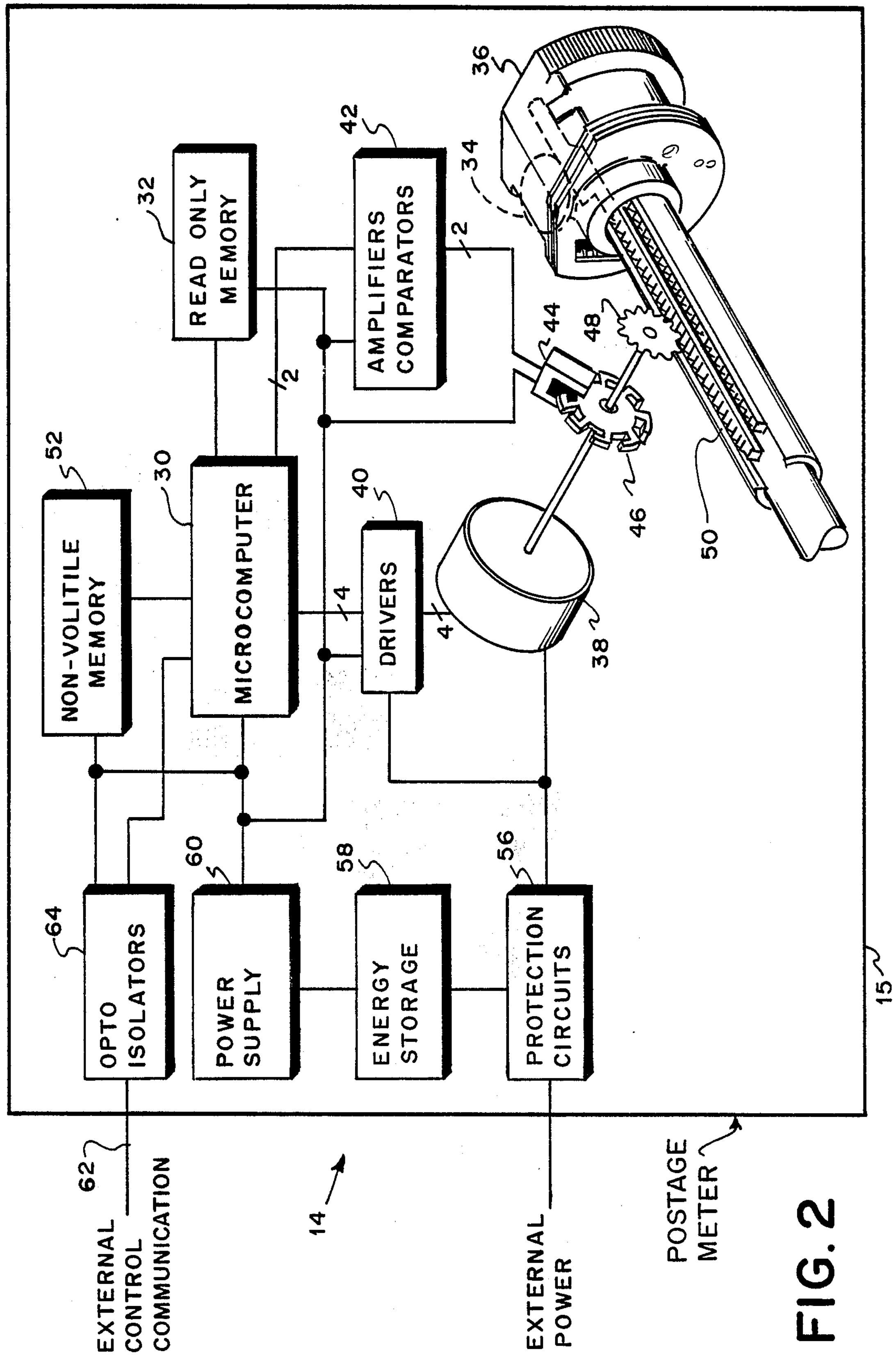
FIG. 2 is a block diagram of a portion of the electronic system of a postage meter system and a perspective view, partially broken away, of a portion of the postage printing system of the postage meter system, embodying the present invention.

Reference is now made to FIG. 2. The electronic postage meter shown in FIG. 2 is operable to maximize the postage setting speed of the printing wheels. Each time the electronic postage meter 14 is energized, the postage meter microcomputer 30 under control of the operating program in the program store, read only memory 32, enters into a mode which increases the setting speed for each setting of the print wheels 34 of the postage printing drum 36. It should be noted that only one print wheel and its associated drive mechanism including the stepping motor 38 and driver 40 is shown. The system includes an associated setting position detection system including the amplifier comparator 42, opto-interrupter 44 and slotted disk 46 coupled via a gear 48 to setting rack 50. The postage meter drum may include other banks of printing wheels, associated drive mechanism and systems to print the various denomination required for the postage value. The postage meter drum may include 3, 4 or even 5 such print wheel systems depending on the denominations to be printed and whether fractional cents are to be printed.

As previously noted, each time the electronic postage meter 14 is energized, under control of the microprocessor 30, the meter enters a mode in which the setting speed for each new setting is increased until in error is detected. At this point, the microcomputer 30 under control of the operating program resident in the read only memory 32 enters into an operating mode in which it reduces the setting speed. The setting speed is reduced to a speed at which no setting error is detected and is retained at that speed for the duration of the period of time that the meter is energized.

It should be noted that this setting speed information can be transferred into the electronic postage meters non-volatile memory 52 to be retained when the meter 14 is deenergized. In such case, when the meter is powered-up again, the information can be transferred into the microcomputer and provide the starting point for the setting speed of the print wheels. Additionally, in accordance with U.S. Pat. No. 4,280,180 for ELECTRONIC POSTAGE METER HAVING FIELD RESETTABLE CONTROL VALUES, the use of the increased setting speed can be a field sereice operation or alternatively a user entered feature. In this regard, the setting speed can be permanently yet or can be varied. It may be desired to permanently set the setting speed for use of the meter in predeterming systems applications and thereafter to run through the error detecting routine only when the meter is used in different applications or in different hardware systems configurations.

In operation, when the meter is energized, external power is applied to the electronic postage meter 14 via input lead 54, protection circuits 56 and energy store 58 to a power supply 60. The power supply 60 is utilized to energize the microcomputer 30 and other electronic components within the meter such as the driver 40 and the amplifier comparator 42. The external power applied to lead 54 is also coupled via the protection circuits 56 to the stepper motor 38 and to the driver 40.

An external control communications channel 62 is provided and is connected to the data bus 16. The communications channel is isolated by an optical isolating system 64 which is coupled to the microcomputer 30. Setting information for the postage printing wheel 34 is communicated to the meter over the bus 16 from the electronic postage scale 12. This information is used by the microcomputer 30 to control the driver 40 to operate the stepping motor 38 to set the print wheel 34 to the selected postage value. Simultaneously, the microcomputer obtains the information regarding the selected postage print wheel setting value from the amplifier comparator 42 which is coupled to the opto-interruptor 44 which senses the rotation of the print wheel by detecting the motion of the slotted disk 46. This provides information regarding the actual setting of the print wheels 34. The information is evaluated in the microcomputed 30 and if an error is detected between the intended value to be set into the print wheel 34 and the actual value detected the microcomputer will prevent the postage printing drum from being energized to rotate and will additionally reduce the setting speed for the next setting of the postage printing wheel 34.

Figure 3:
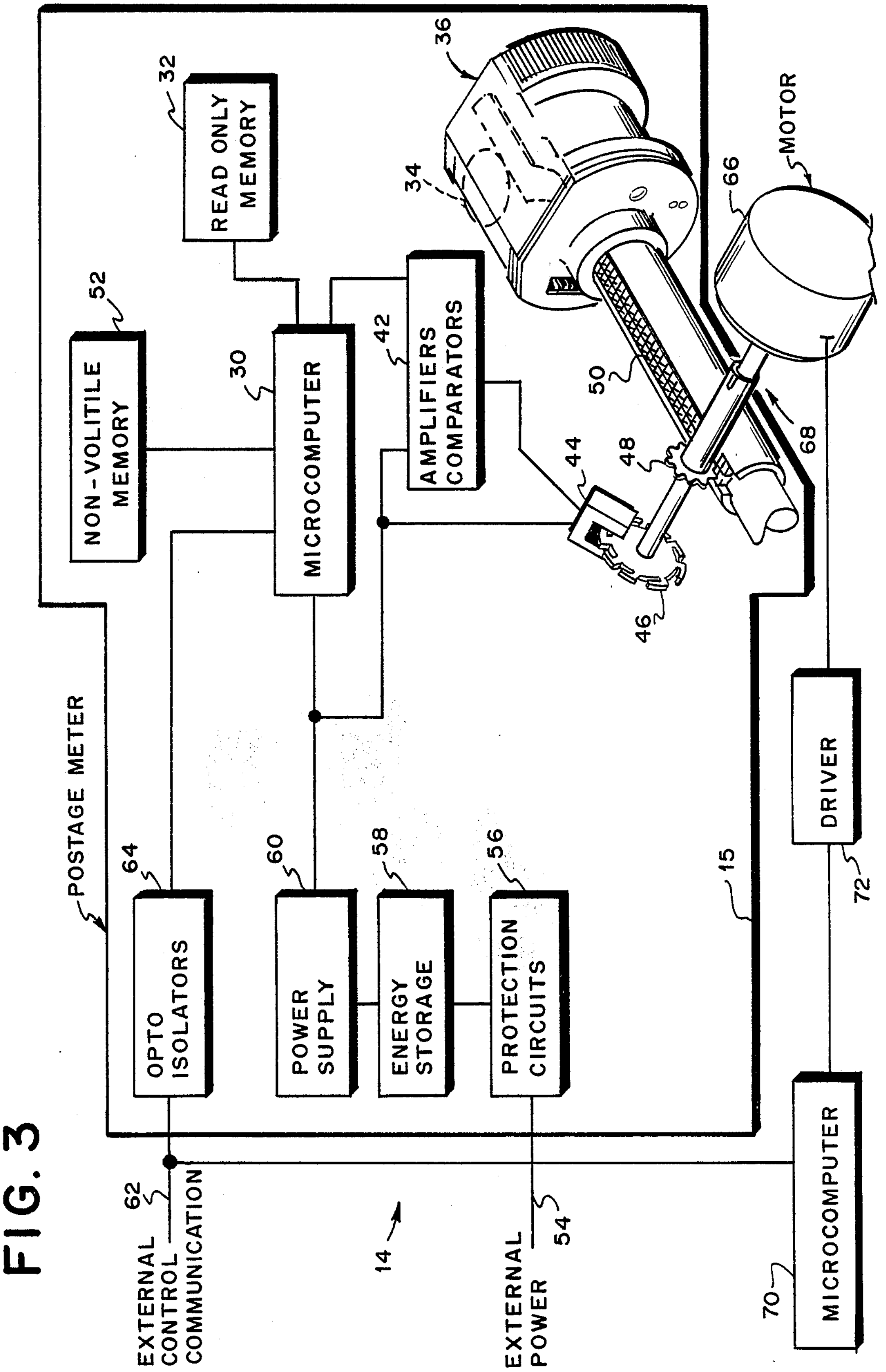
FIG. 3 is an alternate embodiment of the postage meter system shown in FIG. 2 with the postage setting drive motor external to the postage meter secure protective housing.

Reference is now made to FIG. 3 which shows a postage meter system similar to FIG. 2 but having a postage setting driver motor 66 located external to the postage meter secure protective housing 15. The setting motor is connected to the printwheel 34 by a mechanism 68 which projects through the secure housing 15. The operation of the system shown in FIG. 3 is similar to the operation noted above in connection with FIG. 2 however an additional microcomputer 70 (with associated circuitry not shown) is provided for controlling driver 72 to operate the setting drive motor 66. Microcomputer 70 is coupled to the external communications channel and then over bus 16 to the electronic postage scale 14. The microcomputer 70 may be part of the postage meter base 24 for controlling operation of the base.

It should be recognized that the magnitude of the speed increase or decrease will be determined empirically for different mechanisms and drives. Moreover, the setting speeds for any given mechanism cannot be continually increased to higher and higher setting speeds at eventually the motors or drive will fail to respond, will hang up or will break, either as the speed is increased or the mechanism is employed to print postage on mail pieces which require a higher torque. Thus, an upper limit on the setting speed may be resident in the operating program in the read only memory 32 to preclude such problems.

Figure 4:
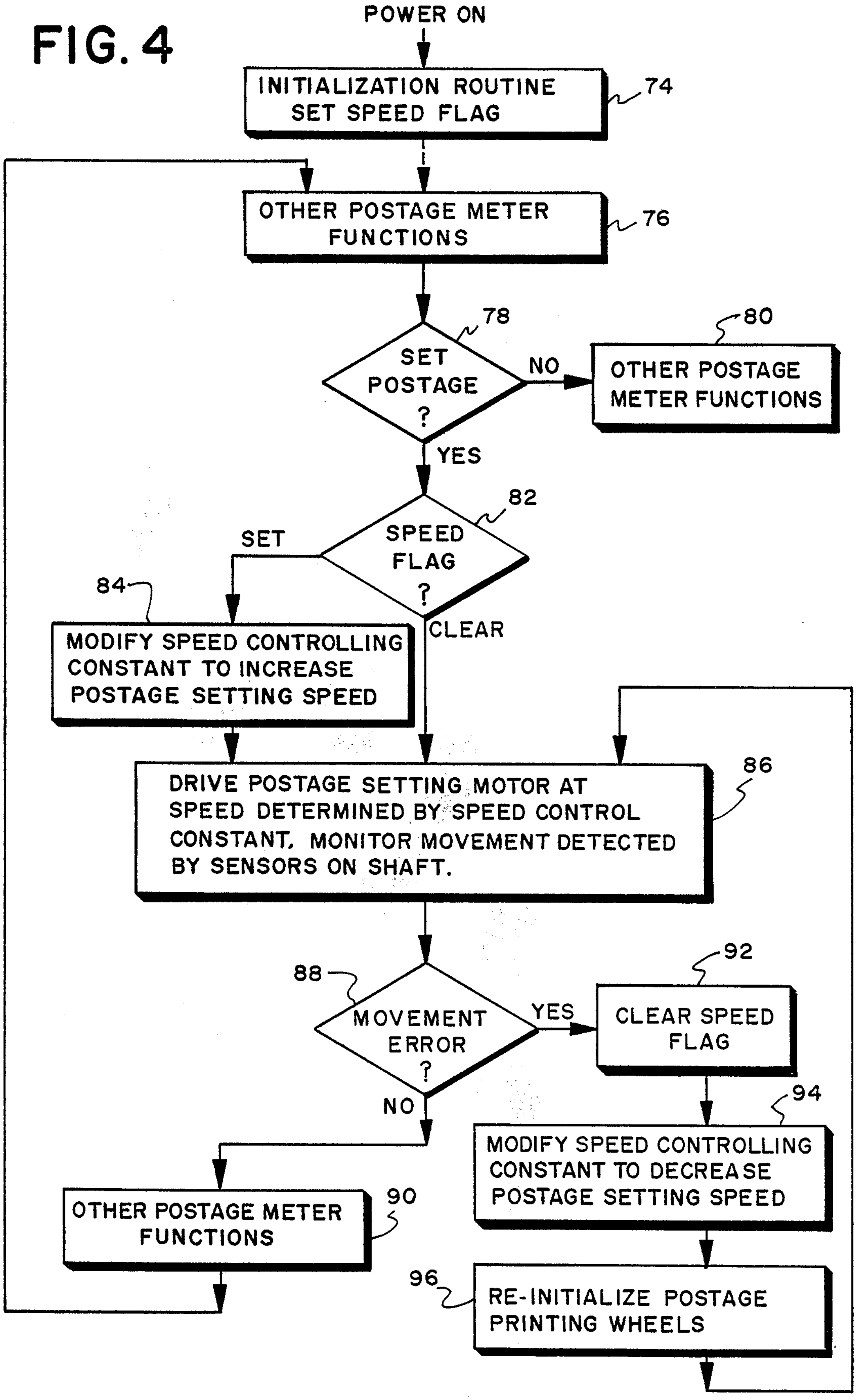
FIG. 4 is a flow chart of the operation of the postage meter system program for operating the postage meter system shown in FIGS. 2 and 3.

Reference is now made to FIG. 4. FIG. 4 is a flow chart of that portion of the postage meter operating program resident in the read only memory 32 for controlling the speed at which the print wheels are set.

In general and as will be described in greater detail in connection with the description of the flow chart, when power is turned on, the microcomputer executes an initialization routine. This routine sets a flag to be tested by the stepping motor controlling routine. When the stepping motor controlling routine is called, it tests the flag, and if the flag has been set, it increases the motor stepping rate by reducing the time period between steps before executing the routine. Each time a new setting activity is initiated, this flow test routine is repeated and the constant determining the step time will be reduced by a predetermined percentage and the setting speed thereby increased. When an error is detected, the motor controlling microcomputer is required to enter an error handling routine. This routine resets the flag previously set by the initialization routine and reduces the motor speed by lengthening the step. The motor controlling routine will then find from this point on, that the flag was reset and will not modify the setting speed. Thus, the setting speed will remain constant until either the power is turned off and then turned on causing the flag to be set again on an error is detected which causes the routine to reduce the setting speed.

In operation, when power is turned on for the electronic postage meter 14, the meter goes through at initialization routine and setting speed flags are set block 74. The meter may proceed to process other meter functions block 76. If it is not desired to set the print wheels decision block 78, the meter may be operated to process other postage meter functions block 80.

If the postage wheels are to be set decision block 78, an inspection is made to determine whether the print wheel setting speed flag is set or clear decision block 82. If the print wheel setting speed flag is set the program branches to modify the speed controlling constant to increase the postage setting speed block 84. Thereafter, the postage setting motor is driven at a speed determined by the speed control constant and movement detected by sensors on the shaft are monitored block 86. If the speed flag is clear, block 86 is entered directly from decision block 82. If a movement error is not detected, decision block 88, other postage meter functions may be enabled block 90 and the program accordingly loops back to block 76 for other postage meter functions.

If, however, a movement error is detected, decision block 88, the speed flag is cleared block 92 and the speed controlling constant is then modified to decrease the postage setting speed block 94. The postage printing wheels are then re-initialized so that they will be at a known position block 96. The program thereafter loops back to block 86 wherein the postage meter setting drive is determined by the speed control constant now entered into the system. While the present invention has been disclosed and described with reference to the above noted embodiment, it will be apparent that variations and modifications may be made therein. It is, thus, intended in the following claims to cover each variation and modification as falls within the true spirit and scope of the present invention.

What is claimed is:

1. In a postage meter system of the type having postage value input selection means for specifying a desired postage value, a postage printing means with a settable printing element and a drive means in communication with said input selection means and coupled to said postage printing means for setting said postage printing element of said postage printing means, a print element setting system, comprising:

said drive means operable to drive said printing element of said postage printing means at different operating speeds to set said postage printing element to selected postage value;

position detecting means for detecting the actual position setting of said printing element; and control means coupled to said input selection means and said drive means for controllably causing said drive means to change the position of said postage printing element from an initial position to a selected position corresponding to the desired postage value specified by said input selection means at a given setting speed and incrementally increasing said setting speed for each successive position change of said postage printing element up to a maximum setting speed;

said control means further coupled to said position detection means for comparing the actual position of said postage printing element to the selected position by said input selection means such that should said selected position and said actual position of said postage printing elements not correspond said control means shall position correct said postage printing element to said selected position and decrement said setting speed and set said maximum setting thereto.

2. A print element setting system as defined in claim 1 wherein said control means includes a microcomputer.

3. A printing element setting system as defined in claim 2 wherein said control means is a microcomputer.

4. A print element setting system as defined in claim 1 further comprising nonvolatile memory means coupled to said control means, for storing setting speed information.

5. A print element setting system as defined in claim 4 wherein said control means processes said setting speed information in said nonvolatile memory to provide an initial starting point for controlling the speed of operation with which said drive means drives said postage printing means settable postage printing element to selected postage values.

6. A print element setting system as defined in claim 5 further comprising power supply means coupled to said control means for energizing said control means to operate, said control means processing said setting speed information in said nonvolatile memory only when said control means is initially energized by said power supply means.

7. In a postage meter system of the type having postage value for selection means for specifying a desired postage value, a postage printing means with a settable printing element and a stepper motor coupled to said postage printing means for setting said postage printing element of said postage printing means, a print element setting system, comprising:

said stepper motor operable to drive said postage printing means settable printing element at different operating speeds to set said postage printing element to selected postage values;

position detection means for detecting the actual position setting said printing element; and microcomputer control means coupled to said input selection means and said stepper motor for controllably causing said stepper motor to change the position of said postage printing element from an initial position to a selected position corresponding to the desired postage value specified by said input selection means at a given setting speed and incrementally increasing said setting speed for each successive position change of said postage printing element up to a maximum setting speed; and said microcomputer control means further coupled to said position detection means for comparing the actual position of said postage printing element to the selected position by said input selection means such that should said selected position and said actual position of said postage printing elements not correspond said control means shall position correct said postage printing element to said selected position and decrement said setting speed and set said maximum setting thereto.

8. In a postage meter system as claimed in claim 7 wherein the speed at which said stepper motor operates is dependent upon the duration of stepping voltage pulses applied to said stepper motor and wherein said microcomputer means controls the duration of said stepping voltage pulses applied to said stepping motor to control the operating speed with which said stepper motor operates to drive said settable printing element of said postage printing means to a selected postage value.

9. A print element setting system as defined in claim 8 wherein said printing element is a printwheel.

* * * * *